United States Patent [19]
Oh

[11] Patent Number: 5,311,374
[45] Date of Patent: May 10, 1994

[54] RECORDING/REPRODUCING SYSTEM USING MEMORY FUNCTIONS OF DIGITAL AUDIO TAPE RECORDER (DAT) AND METHOD THEREOF

[75] Inventor: Yong K. Oh, Seoul, Rep. of Korea

[73] Assignee: Goldstar Co., Ltd., Seoul, Rep. of Korea

[21] Appl. No.: 997,663

[22] Filed: Dec. 29, 1992

Related U.S. Application Data

[63] Continuation of Ser. No. 560,735, Jul. 31, 1990, abandoned.

[30] Foreign Application Priority Data

Jul. 31, 1989 [KR] Rep. of Korea ............... 10928/1989

[51] Int. Cl.$^5$ ........................... G11B 5/09; G11B 5/86
[52] U.S. Cl. ......................................... 360/32; 360/15
[58] Field of Search ............................. 360/15, 13, 32

[56] References Cited

U.S. PATENT DOCUMENTS

| | | | |
|---|---|---|---|
| 4,041,460 | 8/1977 | Wisdom et al. | 364/200 |
| 4,899,230 | 2/1990 | Sherritt | 360/15 |
| 5,021,893 | 6/1991 | Scheffler | 360/15 |
| 5,027,228 | 6/1991 | Yokoyama | 360/15 |

FOREIGN PATENT DOCUMENTS 58-130414  8/1983  Japan ..................................... 360/15

OTHER PUBLICATIONS

The American Heritage Dictionary of the English Language ©1969 p. 678.

*Primary Examiner*—Donald Hajec
*Assistant Examiner*—Won T. C. Kim

[57] ABSTRACT

A recording/reproducing system for use in a digital audio tape recorder using memory functions and a method thereof which are capable of storing reproduced aural signals in a memory bank, and capable of reading and recording the stored aural signals without the use of an additional DAT system. The system includes a memory section for storing signals that are input to a D/A converter from a digital signal processing section, and a memory controlling section for storing signals that are input to the D/A converter from the memory section, and for reading and applying the signals stored in the memory section to the digital signal processing section. As a result, the system and the method for recording/reproducing can duplicate a tape with one DAT by storing reproduced signals in the memory when the DAT is in are producing mode and reading and recording the stored signals in a tape.

6 Claims, 4 Drawing Sheets

RECORDING/REPRODUCING SYSTEM USING MEMORY FUNCTIONS OF DIGITAL AUDIO TAPE RECORDER (DAT) AND METHOD THEREOF

This application is a continuation of application Ser. No. 07/560,735 filed on Jul. 31, 1990, now abandoned.

BACKGROUND OF THE INVENTION

1. Field of the Invention

The present invention relates to a digital audio tape recorder (hereinafter DAT) and more particularly, to a recording/reproducing system using memory functions of the DAT and a method thereof which, by setting up a memory bank, stores reproduced aural signals in the memory bank, reads and records the stored aural signals.

2. Description of the Related Art

In a conventional DAT system as shown in FIG. 1, signals reproduced from a head drum 1 are amplified in a high frequency amplifier 2 and converted to parallel signals in a data processing section 3 and digital-filtered in a digital signal processing section 6. Signals from the digital signal processing section 6 are converted to analog signals through a digital-to-analog converter 7 and are outputted as aural signals. Also, external aural signals are converted to digital signals through an analog-to-digital converter 8 and digital-filtered in the digital signal processing section 6. Then signals from the digital signal processing section 6 are converted to serial signals in the data processing section 3, amplified in the high frequency amplifier 2, and applied to the head drum 1 for recording. A system controlling section 4 receives key signals from a key scanning section 5 and controls the digital signal processing section 6 and a deck controlling section (not shown).

However, the conventional DAT system reproduces signals recorded on a tape and converts the reproduced signals to aural signals for outputting. The conventional DAT system also converts external aural signals to digital signals. Therefore, there is a drawback in that an additional DAT set has to be used when reproducing signals recorded on a tape and recording again the reproduced signals on the tape.

SUMMARY OF THE INVENTION

Accordingly, it is an object of the present invention to provide a recording/reproducing system using memory functions of a digital audio tape recorder and a method thereof which reproduce signals recorded on a tape in one DAT set without the use of an additional DAT set.

Another object of the present invention is to provide a recording/reproducing system using memory functions of a digital audio tape recorder and method thereof which, when reproducing signals recorded on a tape in one DAT set, select and store desired parts of the reproduced signals, read and output the stored parts as reproduced signals when required.

A further object of the present invention is to provide a method of a recording/reproducing system comprising the steps of setting up a memory bank in the DAT system storing reproduced signals in said memory bank when reproducing signals recorded on a tape, reading the signals stored in said memory bank in state of RECORDING mode, and applying the read signals as recording signals.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a recording/reproducing system for use in a digital audio tape recorder using memory functions and a method thereof which are capable of storing reproduced aural signals in a memory bank, and reading and recording the stored aural signals without the use of an additional DAT system. The recording/reproducing system comprising a memory section for storing signals that are inputted to a D/A converter from a digital signal processing section, and a memory controlling section for storing signals that are inputted to the D/A converter to the memory section, and for reading and applying the signals stored n the memory section to the digital signal processing section, whereby the system and the method for recording/reproducing can duplicate a tape with one DAT by storing reproduced signals in the memory when the DAT is in a reproducing mode and reading and recording the stored signals in a tape.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS OF THE PRESENT INVENTION

Figure 1:
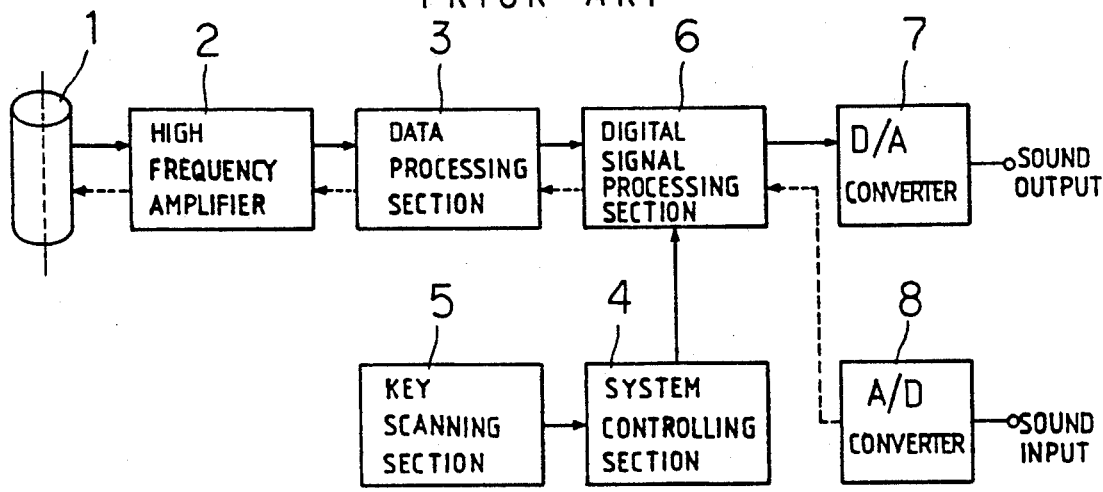
FIG. 1 is a block diagram showing a configuration of a conventional digital audio tape recorder.
Figure 2:
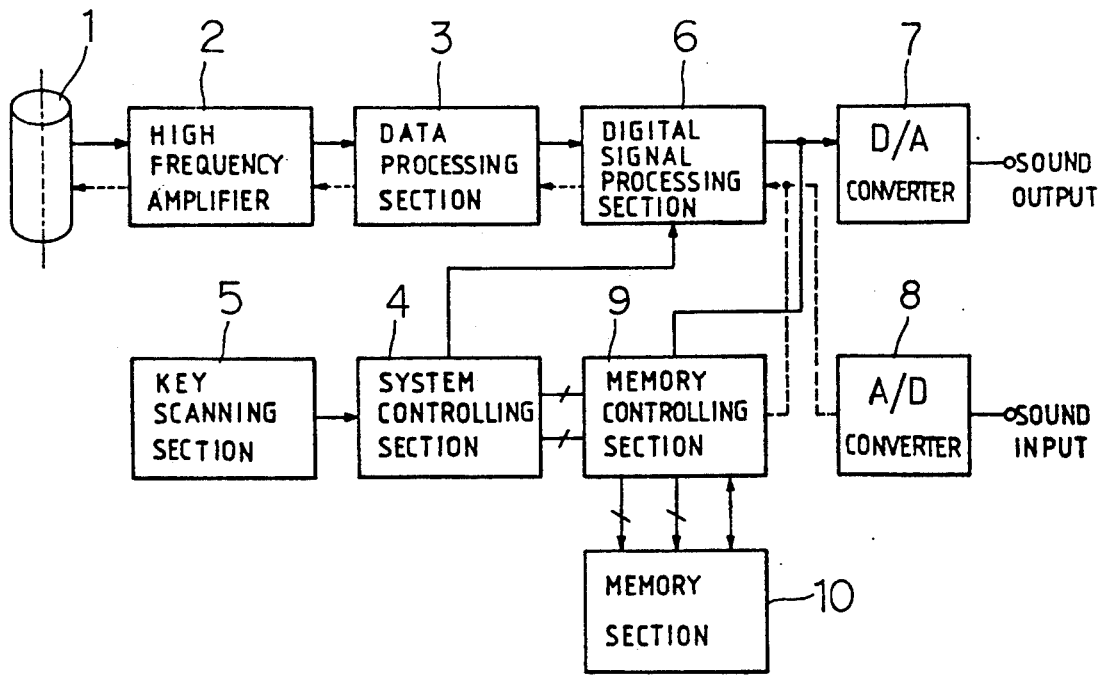
FIG. 2 is a block diagram showing a configuration of the digital audio tape recorder according to an embodiment of the present invention.

Referring to FIG. 2, the digital audio tape recorder according to an embodiment of the present invention is constituted in such a manner that signals reproduced from a head drum 1 are amplified in a high frequency amplifier 2, converted to parallel signals in a data processing section 3, digital-filtered in a digital signal processing section 6 which is controlled by a system controlling section 4, converted to analog signals through a digital-to-analog converter 7 and outputted as aural signals. Also, external aura signals are converted to digital signals through an analog-to-digital converter 8, digital-filtered in the digital signal processing section 6, converted to serial signals in the data processing section 3, amplified in the high frequency amplifier 2, and then applied to the head drum 1 as a recording signal. The DAT system as shown in FIG. 2 also includes a memory section 10 for storing signals that are inputted to the digital-to-analog converter 7 from the digital signal processing section 6, and a memory controlling section 9 for storing signals, which are inputted to the digital-to-analog converter 7 upon the control of the system controlling section 4, and for reading and applying the signals stored in the memory section 10 to the digital signal processing section 6.

Figure 3:
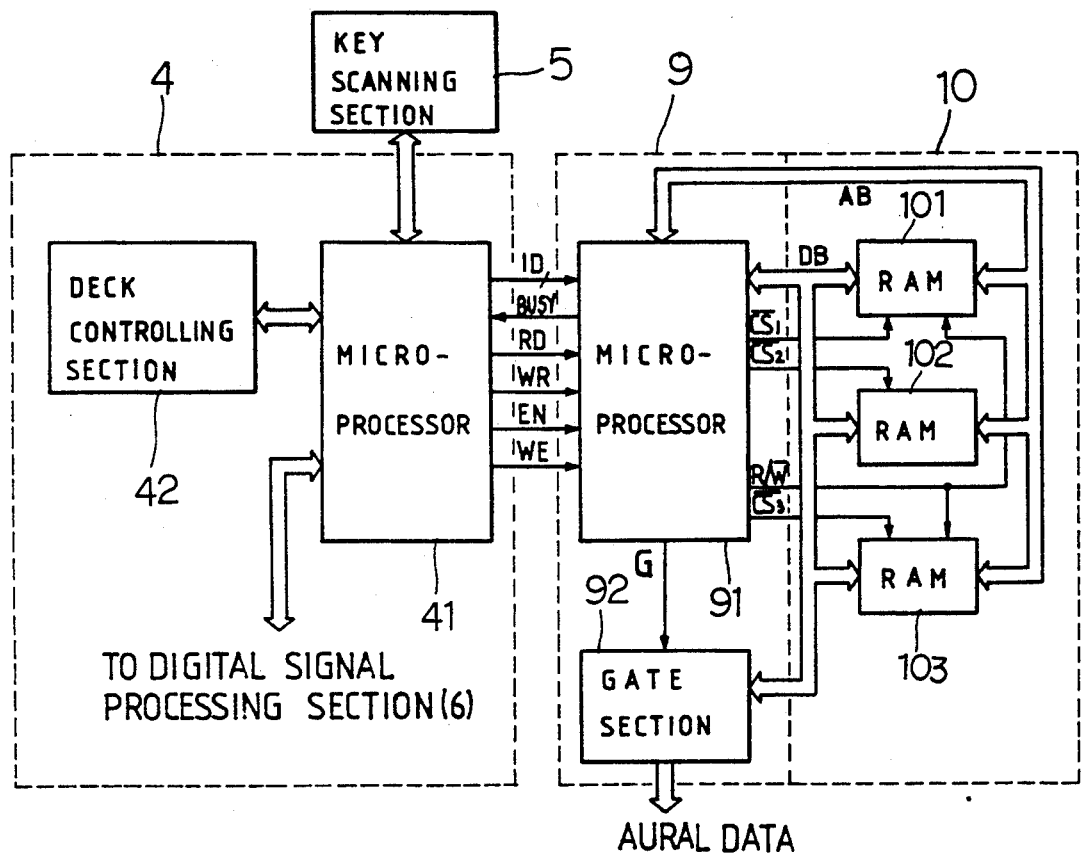
FIG. 3 is a block diagram showing a detailed configuration of the digital audio tape recorder according to the present embodiment.

FIG. 3 is a block diagram showing a detailed configuration for the system controlling section 4, the memory controlling section 9, and the memory section 10 (FIG. 2).

The DAT system as shown in FIG. 3 according to the present embodiment is constituted so that the system controlling section 4 receives key signals of a key scanning section 5 from a first microprocessor 41, and the data are exchanged in a deck controlling section 42 and the first microprocessor 41. Also, an INDEX signal (hereinafter ID), a READ signal (hereinafter RD), a WRITE signal (hereinafter WR), an ENABLE signal (hereinafter EN) and a WRITE ENDING signal (hereinafter WE) are outputted from the microprocessor 41.

The DAT system is further configured so that, upon the control of the signals such as ID, RD, WR, EN, and WE from the microprocessor 41 of the system controlling section 4, a second microprocessor 91 outputs chip selection signals $\overline{CS1}$-$\overline{CS3}$, a READ/WRITE control signal (R/$\overline{W}$) and a gate signal (G), and applies a BUSY signal indicating "in operation" to the first microprocessor 41. The data bus (DB) of the first microprocessor 41 is connected with the digital signal processing section 6 when a GATE section 92 becomes conductive by the GATE signal (G) of the second microprocessor 91.

On the other hand, the memory section 10 is constructed in so that each of the RAMs 101-103 is selected by each of the chip select signals $\overline{CS1}$-$\overline{CS3}$ from the second microprocessor 91 of the memory controlling section 9, and each of the RAMs 101-103 are in a READ or WRITE state by the READ/WRITE control signal (R/$\overline{W}$) of the second microprocessor 91.

Figure 4:
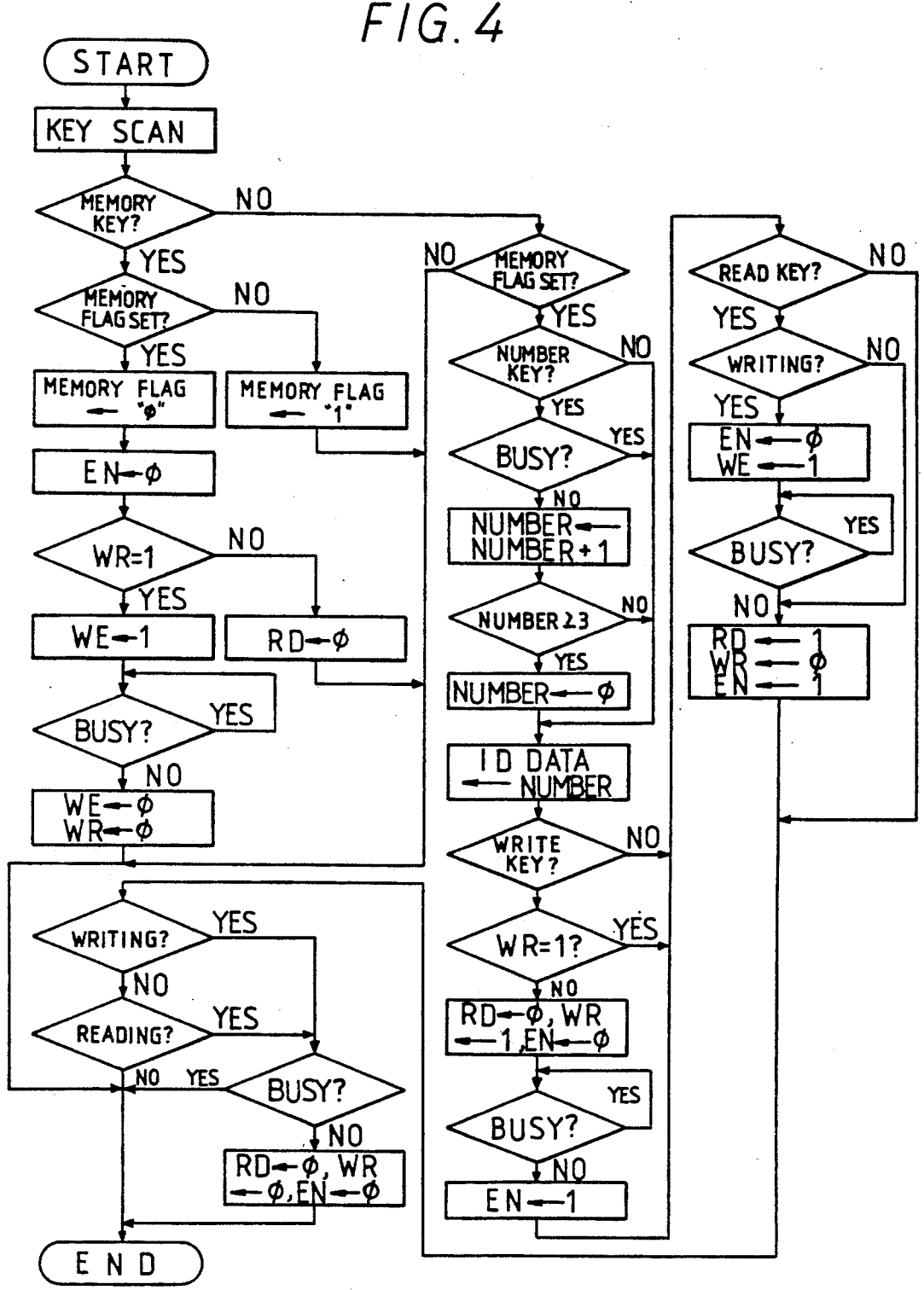
FIG. 4 is a flowchart for a system control according to the present embodiment.
Figure 5:
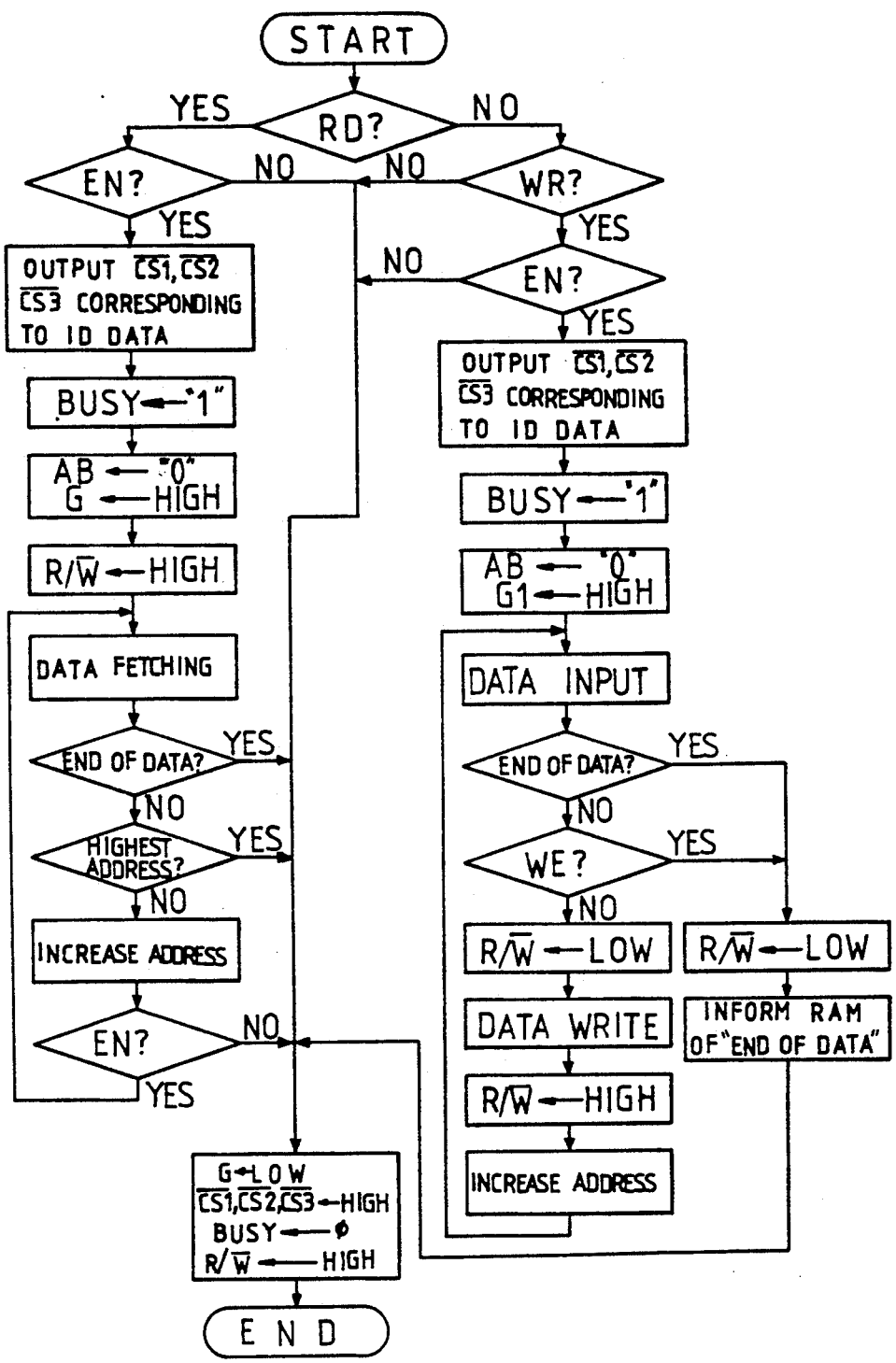
FIG. 5 is a flowchart for a memory control according to the present embodiment.

FIG. 4 is a flowchart for illustrating the control for controlling the second microprocessor 91 of the memory controlling section 9 with reception of key signals of the key scanning section 5 from the first microprocessor 41 of the system controlling section 4, and FIG. 5 is a flowchart illustrating the control for the second microprocessor 91 in the memory controlling section 9.

A detailed description of the operations and effects of the present embodiment will be given below with reference to the flowcharts of FIGS. 4 and 5.

At first, as shown in FIG. 4, key signals of the key scanning section 5 are scanned in the first microprocessor 41. At this time, when a MEMORY key signal is inputted and a memory flag is not set, the memory flag is set. If the memory flag is set when the MEMORY key signal is inputted, the memory flag is cleared and the ENABLE signal (EN) is initialized. At this time, the READ signal (RD) is initialized if the WRITE signal (WR) is not outputted. The WRITE ENDING signal (WE) is outputted if the WRITE signal (WR) is outputted and then the WRITE ENDING signal (WE) and WRITE signal (WR) are initialized when the BUSY signal is not applied from the second microprocessor 91 of the memory controlling section 9.

On the other hand, if the memory flag is set and the memory key signal is not inputted, it is checked whether a NUMBER key signal, a WRITE key signal and a READ key signal are inputted and a function according to the checked condition is performed.

That is, if the NUMBER key signal is inputted, the number increases by "1". The number becomes "0" in cases where the number is more than 3, and the number is immediately outputted as an INDEX signal (ID) in cases where the number is of less than 3. Thereafter, if the WRITE key signal is inputted and the WRITE signal (WR) is not outputted, the READ signal (RD) and the ENABLE signal (EN) are initialized while the WRITE signal is outputted. Thereafter, when the BUSY signal is not applied from the microprocessor 91 of the memory controlling section 9, the ENABLE signal EN is outputted. This state is kept during a writing stage until the BUSY signal (BUSY) is not applied from the second microprocessor 91. On the other hand, when the READ key signal is inputted and the writing is active, the ENABLE signal (EN) is initialized and the WRITE ENDING signal (WE) is outputted. Thereafter, when the BUSY signal (BUSY) from the second microprocessor 91 of the memory controlling section 9 is not applied and the writing is not active, the READ signal (RD) is outputted, the WRITE signal is initialized, and the ENABLE signal (EN) is outputted. This state is kept during a writing state until the BUSY signal (BUSY) is not applied from the second microprocessor 91.

The READ signal (RD), the WRITE signal (WR) and the ENABLE signal (EN) are all initialized when the BUSY signal (BUSY) is not applied from the second microprocessor 91 of the memory controlling section 9 with the WRITE and READ states kept. The second microprocessor 91 of the memory controlling section 9 receives signals from the second microprocessor 41 of the system controlling section 4 and performs controls as illustrated in FIG. 5.

That is, when a READ signal (RD) and an ENABLE signal are inputted from the second microprocessor 41, one of the chip selection signals $\overline{CS1}$-$\overline{CS3}$ corresponding to an INDEX signal (ID) is outputted. That is, a chip selection signal $\overline{CS1}$ is outputted to select a RAM 101 if the INDEX signal (ID) is "0", a chip selection signal $\overline{CS2}$ is outputted to select a RAM 102 if the INDEX signal (ID) is "1", and a chip selection signal $\overline{CS3}$ is outputted to select a RAM 103 if the INDEX signal (ID) is "2". Thereafter, the BUSY signal (BUSY), indicating "in operation", is outputted from the second microprocessor 91 to be applied to the first microprocessor 41, an address signal "0" is outputted on the address bus (AB) to assign an address to the RAMS 101-103 selected in the same manner as described above, and a high-potential GATE signal (G) is outputted to turn the GATE section 92 on. Accordingly, at this time, the data bus (DB) of the second microprocessor 91 is connected with the digital signal processing section 6.

Thereafter, the READ/WRITE control signal (R/$\overline{W}$) is outputted at a high potential from the second microprocessor 91 to change to the the RAMS selected to the READ state in the same manner as described above, the data recorded in a assigned address as described above are read. The data are applied to the digital signal processing section 6 through the GATE section 92. Such a procedure of reading the data is repeated with the address increased by "1" until the end of the data and the highest address are met. When the data fetching procedure is completed, the GATE signal (G) is outputted at a low potential to cut off the GATE section 92. At the same time, all of the chip selection signals $\overline{CS1}$-$\overline{CS3}$ are outputted at a high potential so that the RAMS 101-103 are not selected and the BUSY signal is outputted.

When the WRITE signal (WR) and the ENABLE signal (EN) are inputted to the second microprocessor 91, the chip selection signals corresponding to the INDEX signal (ID) are outputted to select one RAM 101-103, a BUSY signal indicating "in operation" is outputted for application to the first microprocessor 41 of the system controlling section 4, an address signal of "0" is outputted to the address bus (AB) for assigning an address of the RAM selected in the same manner as described above, and the GATE signal (G) of a high potential is outputted to turn the GATE section 92 on.

Therefore, at this time, the data bus (DB) of the second microprocessor 91 is connected with the digital signal processing section 6. Accordingly, at this time, signals from the digital signal processing section 6 to the digital-to-analog converter 7 are transferred to the second microprocessor 91 through the GATE section 92. When the end of the data is not met and the WRITE ENDING signal (WE) is not outputted from the second microprocessor 41, the READ/WRITE control signal (R/$\overline{W}$) is outputted at a low potential to turn the RAM selected in the same manner as described above to a WRITE state, and the data read in the same manner as described above are stored in the assigned address of the selected RAM.

Thereafter, the READ/WRITE control signal (R/$\overline{W}$) is outputted at a high potential and the address increases by "1". The procedure which receives and records the signals which are inputted to the digital-to-analog converter 7 is repeated while the address increases by "1" until the end of the data is met or the WRITE ENDING signal (WE) is applied. Thereafter, when the end of the data is met or the WRITE ENDING signal is applied, the READ/WRITE signal (R/$\overline{W}$) is outputted at a low potential to store the end of the data to the RAM selected in the same manner as described above. Thereafter, the GATE signal (G) is outputted at a low potential to cut off the GATE section 92. At this time, all the chip selection signals $\overline{CS1}$-$\overline{CS3}$ are outputted at a high potential, so that the RAMS 101-103 are not selected and the BUSY signal is not outputted. Accordingly, as described above, while reproducing from a tape, a MEMORY mode is made by the MEMORY key and the WRITE key and a RAM is selected by the NUMBER key, so that the reproduced signals are stored in the RAM.

Also, when the DAT is in the RECORD mode, the READ mode can be made by the MEMORY key and the READ key and a RAM is selected by the NUMBER key so that the signals stored in the RAM can be recorded in a tape.

As described above in detail, the present embodiment can duplicate a tape in one DAT without the use of an additional DAT because, when the DAT is in a reproducing mode, the reproduced signals are stored in the memory section and the stored signals are read for recording in a tape. Also the stored signals in the memory section can be outputted as reproduced signals because the desired parts of the signals are stored in the memory section.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A recording and reproducing system for a digital audio tape recording comprising:
   a head drum for reproducing and recording first aural signals;
   a high frequency amplifier operatively communicative with said head drum for amplifying said first aural signals;
   data processing means operatively communicative with said high frequency amplifier for converting said first aural signals to parallel signals;
   digital signal processing means operatively communicative with said data processing means for digitally filtering said first aural signals;
   a digital-to-analog converter operatively communicative with said digital signal processing means for converting said first aural signals digitally filtered by said digital signal processing means to second aural output analog signals;
   an analog-to-digital converter operatively communicative with said digital signal processing means for converting third external aural analog signals input to the recording and reproducing system to fourth digital aural signals;
   system controlling means for controlling said digital signal processing means;
   a memory section for storing said first aural signals digitally filtered by said digital signal processing means that are also input to said digital-to-analog converter; and
   memory controlling means operatively communicative with said system controlling means, said memory section, said digital signal processing means and said analog-to-digital converter for controlling the storing of said first aural signals that are input to said memory section in response to said system controlling means, and for reading from said memory section said first aural signals stored in said memory section and applying said first aural signals stored in said memory section to said digital signal processing means.

2. The recording and producing system of claim 1, wherein said system controlling means comprises a first microprocessor, said memory controlling means comprises a second microprocessor and said memory section comprises a plurality of RAMS, said second microprocessor outputting chip selection signals for selecting from said plurality of RAMs in said memory section, a READ/WRITE control signal and a GATE signal and applying a BUSY signal indicating an operation state to said first microprocessor when said second microprocessor is being operated and a GATE section for connecting the data bus of said first microprocessor and said digital signal processing means in response to said GATE signal being turned on by said second microprocessor.

3. The recording and reproducing system of claim 2, further comprising:
   a key scanning section operatively communicative with said first microprocessor of said system controlling means for scanning a key signal thereof and setting a memory flag when a MEMORY key signal is input;
   wherein a number, which is initialized at "0", is increased by "1" as an INDEX signal when a NUMBER key signal is input, a WRITE signal and an ENABLE signal are output when a WRITE key signal is input, a READ signal and said ENABLE signal are output when a READ key signal is input, a WRITE ENDING signal is output if said WRITE state is active when said READ key is input and said READ signal and said ENABLE signal are output after outputting said WRITE ENDING signal; and memory controlling procedure means for initializing the signals which control said memory controlling means when said BUSY signal fails to be applied from second microprocessor including, receiving means for receiving signals from said second microprocess or of said memory controlling means, selecting means for selecting one of said RAMs of said memory section according to said INDEX signal when said READ signal and said ENABLE signal are input and when said WRITE signal and said ENABLE signal are input, BUSY signal applying means for applying said BUSY signal to said first microprocessor of said system controlling means, RAM addressing means for addressing the selected RAM of said memory section and turning the GATE section on, detecting means for detecting an end of the data or said WRITE ENDING signal being applied in the WRITE state of the selected RAM, stored signal applying means for applying the signals stored in the address to said digital signal processing means with said address increased until the end of the data is met or the highest address is met in the READ state of the selected RAM, signal storing means for storing signals from said digital signal processing means in the address with said address increased until the end of the data is met or said WRITE ENDING signal is detected to be applied in the WRITE state of the selected RAM and storing the end of the data in the selected RAM when the end of the data is met or said WRITE ENDING signal is applied, and initializing means for initializing said selected RAM after storing the end of the data in the selected RAM.

4. A method for recording and reproducing signals by a digital audio tape recorder, comprising the steps of:

(a) reproducing and recording fist aural signals by a head drum;

(b) amplifying said first aural signals by a high frequency amplifier operatively communicative with said head drum;

(c) converting said first aural signals to parallel signals by data processing means operatively communicative with said with frequency amplifier;

(d) digitally filtering said first aural signals by digital signal processing means operatively communicative with said data processing means;

(e) converting said first aural signals digitally filtered at said step (d) to second aural output analog signals by a digital-to-analog converter operatively communicative with said digital signal processing means;

(f) converting third external aural analog signals input to the digital audio tape recorder to fourth digital aural signals by an analog-to-digital converter operatively communicative with said digital signal processing means;

(g) controlling said step (d) of digitally filtering by system controlling means operatively communicative with said digital signal processing means;

(h) storing said first aural signals digitally filtered at said step (d), that are also input to said digital-to-analog converter, in a memory section;

(i) controlling the storing of said first aural signals that are input to said memory section in response to the controlling of said digital filtering at said step (g) by memory controlling means operatively communicative with said memory section, said digital signal processing means and said analog-to-digital converter;

(j) reading from said memory section said first aural signals stored in said memory section by said memory controlling means; and (k) applying said first aural signals stored in said memory section to said digital signal processing means.

5. The method for recording and reproducing signals by a digital audio tape recorder of claim 4, further comprising the steps of:

(l) outputting chip selection signals for selecting from a plurality of RAMs in said memory section, a READ/WRITE control signal and a GATE signal by a first microprocessor of said memory controlling means;

(m) applying a BUSY signal by said first microprocessor indicating an operation state to a second microprocessor of said system controlling means when said first microprocessor is being operated; and (n) connecting the data bus of said second microprocessor and said digital signal processing means in response to said GATE signal being turned on by said first microprocessor.

6. The method for recording and reproducing signals by a digital audio tape recording of claim 5, further comprising the steps of:

setting a memory flag when a MEMORY key signal is input by scanning a key signal of a key scanning section operatively communicative with said second microprocessor of said system controlling means;

outputting a number, which is initialized at "0", increased by "1" as an INDEX signal when a NUMBER key signal is input;

outputting a WRITE signal and a ENABLE signal when a WRITE key signal is input;

outputting a WRITE ENDING signal if said WRITE state is active when said READ key is input;

outputting said READ signal and said ENABLE signal after outputting said WRITE ENDING signal;

initializing the signals for controlling said memory controlling means when said BUSY signal fails to be applied from said first microprocessor of said memory controlling means in a system controlling procedure; and performing a memory controlling procedure including the steps of, receiving signals from said first microprocessor of said memory controlling means, selecting one of said RAMs of said memory section according to said INDEX signal when said READ signal and said ENABLE signal are input, applying said BUSY signal to said first microprocessor of said system controlling means, addressing the selected RAM of said memory section and turning the GATE section on, applying the signals stored in the address to said digital signal processing means with said address increased until the end of the data is met or the highest address is met in the READ state of the selected RAM, selecting one of the RAMs of said memory section according to said INDEX signal when a WRITE signal and an ENABLE signal are input, applying said BUSY signal to said memory section according to said INDEX signal when a WRITE signal and an ENABLE signal are input, applying said BUSY signal to said first microprocessor of said system controlling means, addressing the selected RAM of said memory section and turning the GATE section on, detecting an end of the data or said WRITE ENDING signal being applied in the WRITE state of the selected RAM, storing signals from said digital signal processing means in the address with said address increased until the end of the data is met or said WRITE ENDING signal is detected to be applied in the WRITE state of the selected RAM.

storing the end of the data in said selected RAM when the end of the data is met or said WRITE ENDING signal is applied, and initializing said selected RAM after storing the end of the data in said selected RAM.

* * * * *